United States Patent
Pan et al.

(10) Patent No.: US 11,803,100 B2
(45) Date of Patent: Oct. 31, 2023

(54) METHOD AND SYSTEM FOR ACQUIRING OPERATING PARAMETERS OF PHOTOGRAPHIC LENS

(71) Applicant: Shenzhen Dongzheng Optical Technology Co., Ltd, Guangdong (CN)

(72) Inventors: YiQiang Pan, Guangdong (CN); Hao Li, Guangdong (CN); Yi Xu, Guangdong (CN); SongJian Yao, Guangdong (CN); JieMing Li, Guangdong (CN); Bin Zhang, Guangdong (CN)

(73) Assignee: SHENZHEN DONGZHENG OPTICAL TECHNOLOGY CO., LTD, Guangdong (CN)

( * ) Notice: Subject to any disclaimer, the term of this patent is extended or adjusted under 35 U.S.C. 154(b) by 0 days.

(21) Appl. No.: 17/517,680

(22) Filed: Nov. 3, 2021

(65) Prior Publication Data

US 2023/0136242 A1    May 4, 2023

(51) Int. Cl.
*H04N 23/55* (2023.01)
*G03B 17/14* (2021.01)
*G03B 7/091* (2021.01)
*G03B 17/00* (2021.01)
*G03B 5/00* (2021.01)
*G03B 7/26* (2021.01)
*G03B 7/20* (2021.01)

(52) U.S. Cl.
CPC ............ *G03B 7/091* (2013.01); *G03B 5/00* (2013.01); *G03B 7/20* (2013.01); *G03B 7/26* (2013.01); *G03B 17/00* (2013.01); *G03B 17/14* (2013.01); *H04N 23/55* (2023.01)

(58) Field of Classification Search
CPC ..................................... G03B 17/14
See application file for complete search history.

(56) References Cited

U.S. PATENT DOCUMENTS

| | | | | |
|---|---|---|---|---|
| 4,355,293 | A * | 10/1982 | Driscoll | H01C 10/30 338/183 |
| 8,139,140 | B2 * | 3/2012 | Yumiki | H04N 5/232945 396/64 |
| 9,237,273 | B2 * | 1/2016 | Maruyama | G06T 7/70 |
| 9,367,119 | B2 * | 6/2016 | Sala | G06F 1/3287 |
| 10,897,565 | B2 * | 1/2021 | Takanashi | H04N 5/2254 |
| 11,093,015 | B2 * | 8/2021 | Yamanaka | H04N 5/23209 |
| 2020/0218030 | A1 * | 7/2020 | Kishimoto | G03B 5/00 |
| 2021/0127052 | A1 * | 4/2021 | Tanaka | G03B 17/14 |
| 2021/0274080 | A1 * | 9/2021 | Doi | H04N 5/23258 |

* cited by examiner

*Primary Examiner* — Leon W Rhodes, Jr.
(74) *Attorney, Agent, or Firm* — CANTOR COLBURN LLP

(57) ABSTRACT

The present invention provides a method and system for acquiring operating parameters of a photographic lens, including: a control circuit and a storage unit that are configured in the photographic lens, where the control circuit acquires an operating parameter of the photographic lens by using a focusing ring position sensor, a zoom ring position sensor, an aperture ring position sensor, an accelerometer and a gyro sensor; and the control circuit is further connected to a camera or an external data reading device by using a communication interface, to output the operating parameter after data encapsulation in real time.

10 Claims, 5 Drawing Sheets

METHOD AND SYSTEM FOR ACQUIRING OPERATING PARAMETERS OF PHOTOGRAPHIC LENS

BACKGROUND OF THE INVENTION

The present invention relates to the technical field of pipe-jacking construction, in particular to a guiding type miniature pipe-jacking construction method.

In the field of photography technologies, a lens is either referred to as a photographic lens used in a camera or referred to as an image fragment that is photographed by a camera after turning it on until turning it off. The image fragment is a basic unit of film and television creation. The technique of photographing the image fragment directly affects the difficulty of post-production of film and television works and the final picture effect. In fact, the technique of photographing the image fragment is realized ultimately by depending on the operation of the camera and the photographic lens.

Generally, in the photography process, various operating parameters of the photographic lens are set according to the expected picture effects, including but not limited to: a zoom parameter, a focus parameter, an aperture parameter, and the like. The operating parameters need to be recorded, so that, on the one hand, a consistent picture effect is obtained by using the same parameters during repeated photography. On the other hand, the parameters are used as reference data for post-processing, to provide the equipment with the operating parameters of the photographic lens.

In the photography process, the operating parameters of the photographic lens are recorded, as references in the photography process or post-processing, in the memo or the body of the photographic lens in a relatively elementary means of using paper and pens or pasting a tape mark. Obviously, such a means is excessively cumbersome.

With the continuous development of digital information technologies, a variety of photographic lenses that obtain, by calculating self-imaging data, and record operating parameters such as a zoom parameter, a focus parameter, and an aperture parameter are innovated in the related art. However, communication protocols used by different brands of photographic lenses are not fully disclosed. Special equipment must be used for docking to store data. It is difficult to obtain visual and readable data independent of image data. For example, the "PHOTOGRAPHY PARAMETER RECORDING DEVICE, PHOTOGRAPHY METHOD, AND EDITING SYSTEM" disclosed by the Chinese Utility Model with the patent number CN1052129C is one of the solutions.

BRIEF SUMMARY OF THE INVENTION

The present invention aims to provide a method for acquiring operating parameters of a photographic lens, to digitally acquire and record the operating parameters of the photographic lens with preferable compatibility and high precision.

In the present invention, the following technical solution is used for achieving the foregoing objective.

A method for acquiring operating parameters of a photographic lens includes acquiring in the photographic lens, by a control circuit, an operating parameter of a photographic lens, performing data encapsulation, by the control circuit, on the operating parameter of the photographic lens, writing the encapsulated parameter into a storage unit, and transmitting the encapsulated parameter to the camera or an external data reading device in real time, where the acquiring, by a control circuit, an operating parameter of a photographic lens at least includes:

(1) obtaining, by the control circuit, electrical signals corresponding to current positions of a focusing ring, a zoom ring, and an aperture ring respectively during rotations, to convert the electrical signals into optical parameters of a focus, a zoom, and an aperture; and (2) obtaining, by the control circuit, an electrical signal corresponding to a current pose of the photographic lens when the pose of the photographic lens changes, to convert the electrical signal into motion parameters including but not limited to a position parameter and a posture parameter.

According to the method for acquiring operating parameters of a photographic lens, the present invention further provides a system for acquiring operating parameters of a photographic lens as follows, to provide hardware solution for the foregoing method.

A system for acquiring operating parameters of a photographic lens includes a control circuit and a storage unit that are configured in the photographic lens, where the control circuit includes a processing unit and a focusing ring position sensor, a zoom ring position sensor, an aperture ring position sensor, an accelerometer, a gyro sensor, a communication interface, a power connector that are connected to the processing unit; the control circuit acquires an operating parameter of the photographic lens by using the focusing ring position sensor, the zoom ring position sensor, the aperture ring position sensor, the accelerometer and the gyro sensor, performs data encapsulation on the operating parameter, and writes the encapsulated parameter into the storage unit; and the control circuit is further connected to a camera or an external data reading device by using the communication interface, to output the operating parameter after the data encapsulation in real time.

In the system for acquiring operating parameters of a photographic lens, the focusing ring position sensor, the zoom ring position sensor, and the aperture ring position sensor each include a ring circuit board attached to a lens body in the photographic lens, and the ring circuit boards are connected to the processing unit; two carbon film resistors are provided on the ring circuit board, the carbon film resistors are set in a fan ring concentrically aligned with the ring circuit board, and the two carbon film resistors are provided in parallel and spaced apart in the same fan sector of the ring circuit board; the focusing ring position sensor, the zoom ring position sensor, and the aperture ring position sensor include short-circuit electrodes correspondingly attached to the focusing ring, the zoom ring, and the aperture ring in the photographic lens, and the short-circuit electrode is provided with two elastic members; the elastic members of the short-circuit electrodes in the focusing ring position sensor, the zoom ring position sensor, and the aperture ring position sensor are in elastic contact with the carbon film resistors on the ring circuit boards in a one-to-one correspondence, and the elastic members slide along circumferences of the carbon film resistors; and when the focusing ring, the zoom ring, and the aperture ring of the photographic lens rotate, the two carbon film resistors on the ring circuit board are configured, by using the short-circuit electrodes, as varistors connected to the processing unit.

Compared with the related art, the present invention has beneficial effects:

(1) In the photographic lens, the control circuit acquires, stores, and outputs operating parameters of the photographic lens, which is independently of the image data with good compatibility and high precision.

(2) The acquired and stored operating parameters of the photographic lens are not limited to optical parameters of a focus, a zoom, and an aperture, and further include but are not limited to motion parameters of a position and a posture, to provide increasing full data guidance in the photography process and the post-processing.

(3) Real-time operating parameters of the photographic lens are provided for the camera or an external data reading device connected to the photographic lens.

The present invention is further described below with reference to accompanying drawings and specific implementations.

DETAILED DESCRIPTION OF THE INVENTION

An implementation of a method for acquiring operating parameters of a photographic lens according to the present invention includes: acquiring in the photographic lens, by a control circuit, an operating parameter of a photographic lens, performing data encapsulation, by the control circuit, on the operating parameter of the photographic lens, writing the encapsulated parameter into a storage unit, and transmitting the encapsulated parameter to the camera or an external data reading device in real time, where the acquiring, by a control circuit, an operating parameter of a photographic lens at least includes:

(1) obtaining, by the control circuit, electrical signals corresponding to current positions of a focusing ring, a zoom ring, and an aperture ring respectively during rotations, to convert the electrical signals into optical parameters of a focus, a zoom, and an aperture; and (2) obtaining, by the control circuit, an electrical signal corresponding to a current pose of the photographic lens when the pose of the photographic lens changes, to convert the electrical signal into motion parameters including but not limited to a position parameter and a posture parameter.

Figure 1:
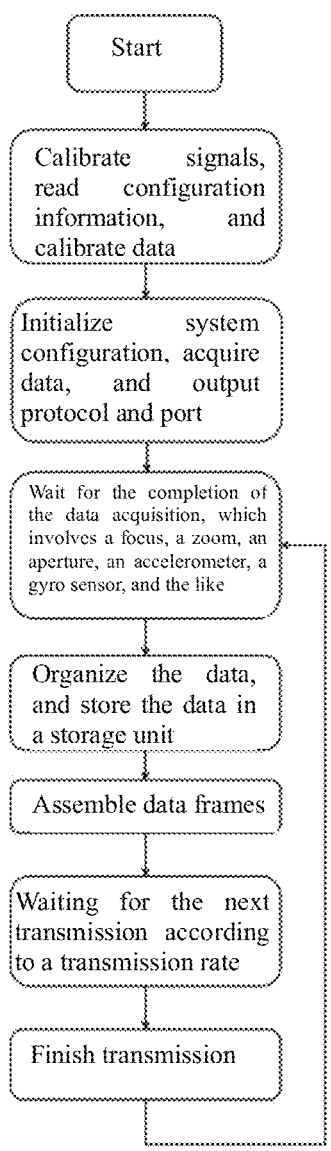
FIG. 1 is a block diagram of a principle of a method for acquiring operating parameters of a photographic lens according to the present invention.

The principle of the method for acquiring operating parameters of a photographic lens according to the present invention is shown in FIG. 1. In the forgoing implementation, in the photographic lens, the control circuit acquires, stores, and outputs operating parameters of the photographic lens, which is independently of the image data with good compatibility and high precision. The acquired and stored operating parameters of the photographic lens are not limited to optical parameters of a focus, a zoom, and an aperture, and further include but are not limited to motion parameters of a position and a posture, to provide increasing full data guidance in the photography process and the post-processing. Real-time operating parameters of the photographic lens are provided for the camera or an external data reading device connected to the photographic lens.

In a preferable implementation, the collecting, by a control circuit, an operating parameter of a photographic lens further includes: obtaining, by the control circuit, electrical signals corresponding to an internal temperature and humidity of the photographic lens, to convert the electrical signals into current internal environment parameters of the photographic lens. The acquired internal environment parameters of the photographic lens can be used to monitor the internal temperature and humidity of the photographic lens in real time, to prevent the lens from being exposed to relatively high humidity for a long time to produce mold, which affects the optical quality and the internal structure, and can also provide a temperature basis of temperature compensation algorithm correction for the control circuit, so that the accuracy of data acquisition is increasing high.

In a preferable implementation, the collecting, by a control circuit, an operating parameter of a photographic lens further includes: obtaining, by the control circuit, an electrical signal corresponding to an external environment air pressure of the photographic lens, to convert the electrical signal into current external environment parameter of the photographic lens. The acquired external environment parameters of the photographic lens can provide a record of the current environment air pressure for photography such as photography in a storm or under air pressure of a real environment, which can be later connected to digital cinemas to provide audiences when watching movies with a higher-dimensional on-site observation experience.

Figure 2:
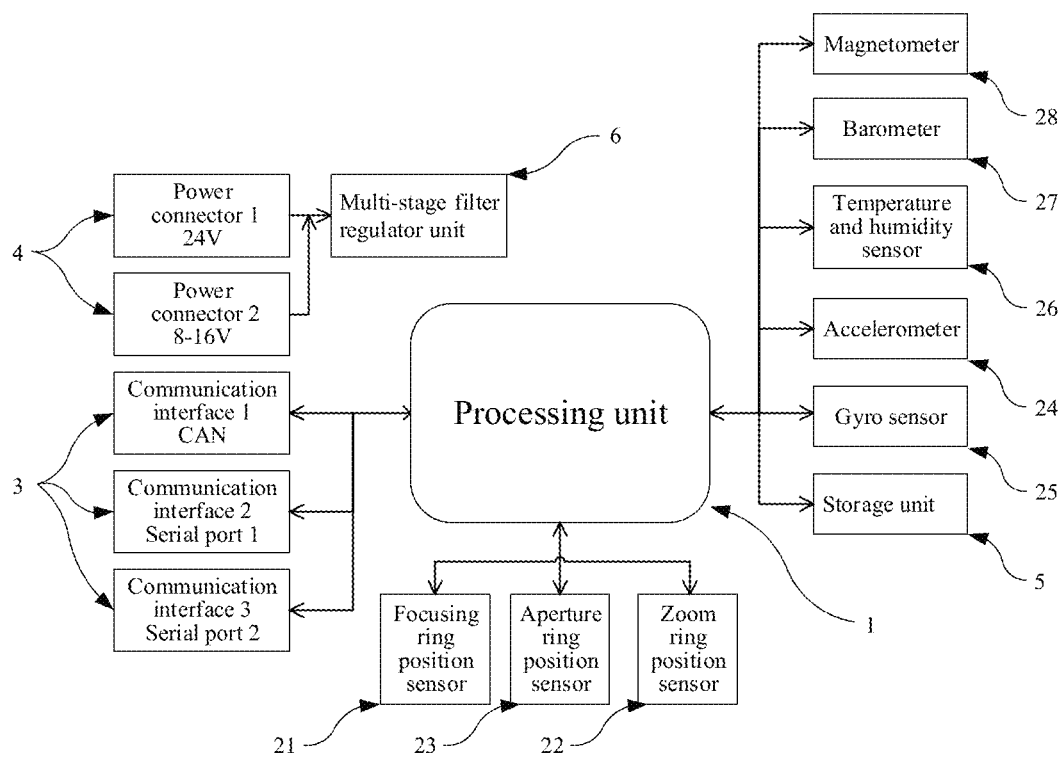
FIG. 2 is a logic block diagram of a system for acquiring operating parameters of a photographic lens according to the present invention.
Figure 3:
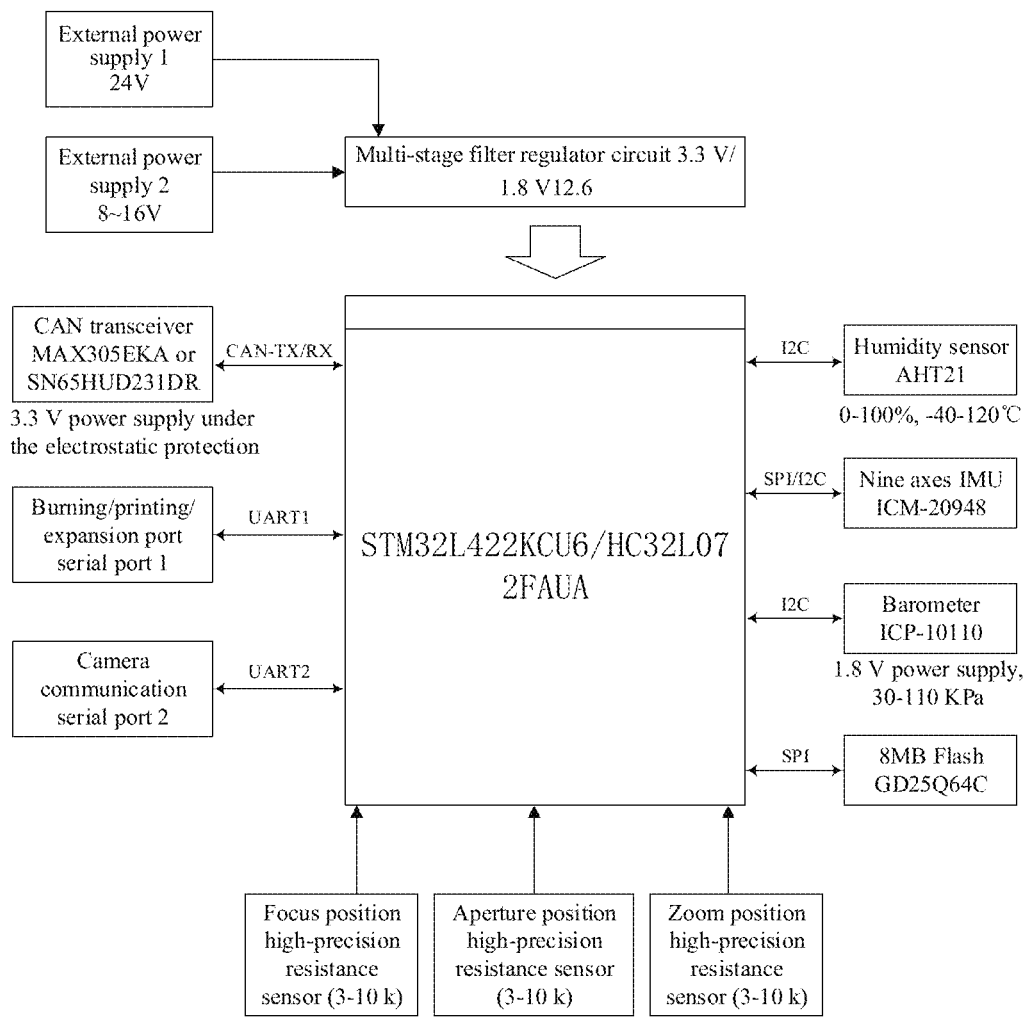
FIG. 3 is an electrical principal diagram of the system for acquiring operating parameters of a photographic lens according to the present invention.

As shown in FIG. 2 and FIG. 3, the present invention provides the method for acquiring operating parameters of a photographic lens with a hardware solution as follows.

The system for acquiring operating parameters of a photographic lens includes: a control circuit and a storage unit that are configured in the photographic lens, where the control circuit includes a processing unit 1 and a focusing ring position sensor 21, a zoom ring position sensor 22, an aperture ring position sensor 23, an accelerometer 24, a gyro sensor 25, a communication interface 3, a power connector 4 that are connected to the processing unit 1; the control circuit acquires an operating parameter of the photographic lens by using the focusing ring position sensor 21, the zoom ring position sensor 22, the aperture ring position sensor 23, the accelerometer 24 and the gyro sensor 25, performs data encapsulation on the operating parameter, and writes the encapsulated parameter into the storage unit 5; and the control circuit is further connected to a camera or an external data reading device by using the communication interface 3, to output the operating parameter after the data encapsulation in real time.

In the foregoing implementation of the system for acquiring operating parameters of a photographic lens according to the present invention, a hardware basis is constructed in the photographic lens to acquire the operating parameters of the photographic lens.

The focusing ring position sensor 21, the zoom ring position sensor 22, the aperture ring position sensor 23 are used for obtaining information about positions of the focusing ring, the zoom ring, and the aperture ring in the photographic lens, to ensure optical parameters of the focus, the zoom, and the aperture. The accelerometer 24 and the gyro sensor 25 are used for obtaining position changes and posture information of the photographic lens to ensure motion parameters of a position and a posture. The communication interface 3 is used for supporting the control circuit to be connected to a camera or an external data reading device, thereby outputting encapsulated operating parameters in real time to the camera or the external data reading device.

As shown in FIG. 2 and FIG. 3, the communication interface 3 may include a plurality of CAN bus interfaces and serial ports, to be flexibly compatible with the storage unit integrated with the camera and an external storage unit. The example in which the communication interface 3 includes CAN bus interfaces is used. The control circuit, by using a data cable, is connected to an external storage unit such as a data storage box that provides a TF card to read and write FATFS files. An estimated storage rate of such a box is 8-20 M/hour, and one card with 128 GB is estimated to store at least 8000-h data.

Preferably, the control circuit further includes a temperature and humidity sensor 26 connected to the processing unit 1, thereby obtaining electrical signals corresponding to the internal temperature and humidity of the photographic lens.

Preferably, the control circuit further includes a barometer 27 connected to the processing unit 1, thereby obtaining an electrical signal corresponding to the external environment air pressure of the photographic lens.

Preferably, as shown in FIG. 3, the accelerometer 24 and the gyro sensor 25 are provided by an integrated circuit with a model of ICM20948, and the integrated circuit with a model of ICM20948 additionally provides a magnetometer 28 for the control circuit, which aims for the relatively large quantity of circuits in the photographic lens and a shell that is partially shielded by metal. The control circuit may perform high-precision magnetic field detection and calibration by using the magnetometer 28, to obtain stable motion parameters. In the electrical principle shown in FIG. 3, the solution of using the integrated circuit with a model of ICM20948 is only intended to reveal an improvement solution for adding the magnetometer 28 to the control circuit, rather than limiting the specific model of the integrated circuit.

In the electrical principal diagram shown in FIG. 3, the SMT32L single-chip microcomputer/HC32L series single-chip microcomputer is used as the processing unit 1, the AHT21 chip is used as the temperature and humidity sensor 26, the ICP-10110 chip is used as the barometer 27, and the storage unit 5 is constructed by using the GD25Q64C chip. Similarly, the electrical principle shown in FIG. 3 is only intended to reveal a feasible configuration scheme for the control circuit rather than limit the replaceable circuit structure and replaceable chip type in the control circuit.

Preferably, the control circuit is provided with a multi-stage filter regulator unit 6, and the power connector 4 is connected to a processing system by using the multi-stage filter regulator unit 6. The multi-stage filter regulator unit 6 through multi-stage filtering, shielding, and circuit design ensures smaller power and signal interferences, so that the system performance is increasing stable and reliable.

Figure 4:
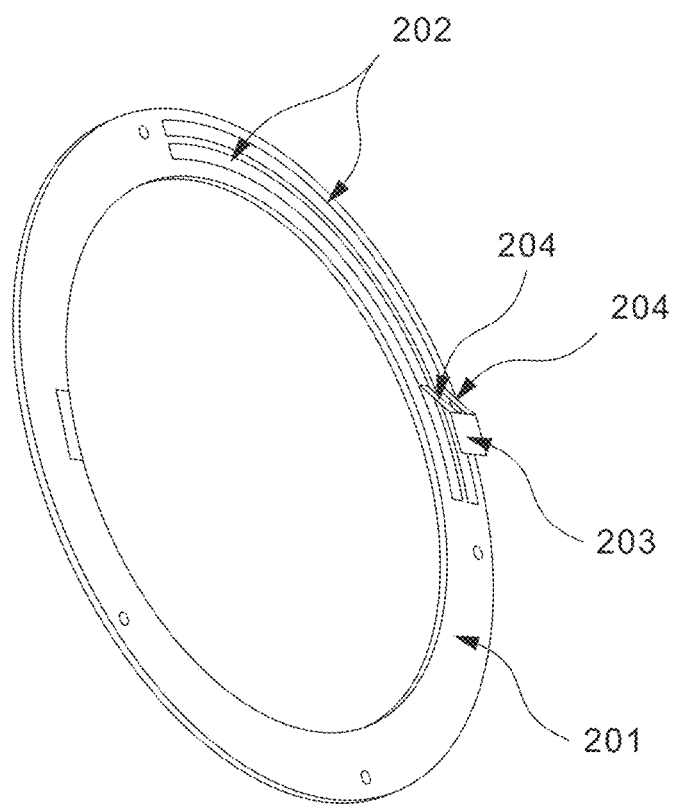
FIG. 4 is a schematic structural diagram of a ring circuit board in the system for acquiring operating parameters of a photographic lens according to the present invention.
Figure 5:
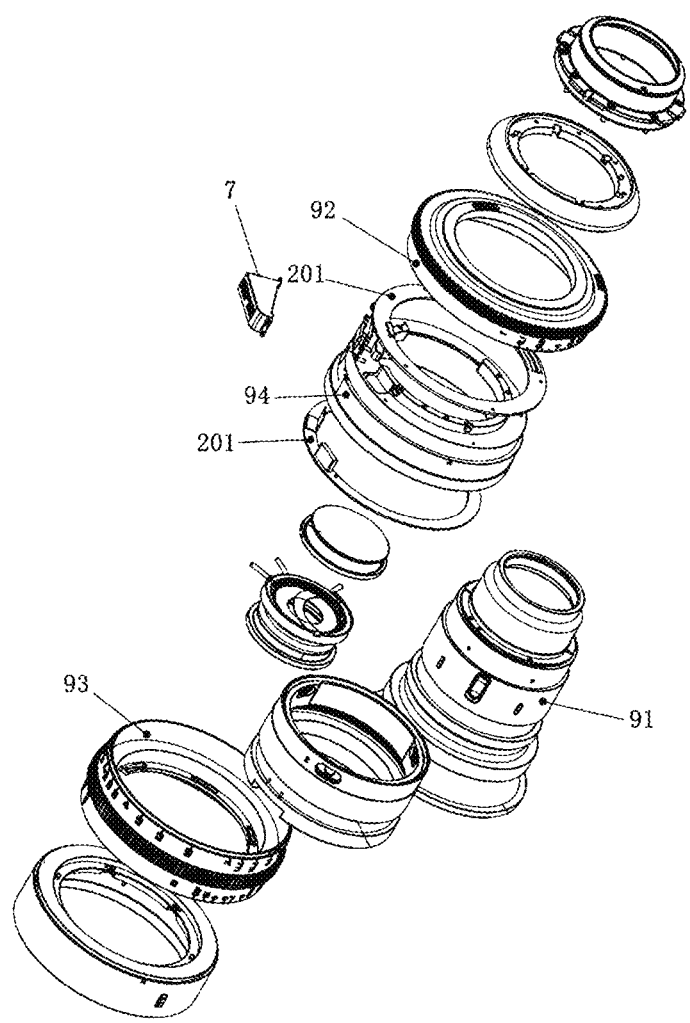
FIG. 5 is a schematic diagram of use reference of the system for acquiring operating parameters of a photographic lens according to the present invention.

Preferably, as shown in FIG. 4 and FIG. 5, the focusing ring position sensor 21, the zoom ring position sensor 22, and the aperture ring position sensor 23 each include a ring circuit board 201 attached to a lens body 91 in the photographic lens, and the ring circuit boards 201 are connected to the processing unit 1; two carbon film resistors 202 are provided on the ring circuit board 201, the carbon film resistors 202 are set in a fan ring concentrically aligned with the ring circuit board 201, and the two carbon film resistors 202 are provided in parallel and spaced apart in the same fan sector of the ring circuit board 201; the focusing ring position sensor 21, the zoom ring position sensor 22, and the aperture ring position sensor 23 include short-circuit electrodes 203 correspondingly attached to the focusing ring 92, the zoom ring 93, and the aperture ring 94 in the photographic lens, and the short-circuit electrode 203 is provided with two elastic members 204; the elastic members 204 of the short-circuit electrodes 203 in the focusing ring position sensor 21, the zoom ring position sensor 22, and the aperture ring position sensor 23 are in elastic contact with the carbon film resistors 202 on the ring circuit boards 201 in a one-to-one correspondence, and the elastic members 204 slide along circumferences of the carbon film resistors 202; and when the focusing ring 92, the zoom ring 93, and the aperture ring 94 of the photographic lens rotate, the two carbon film resistors 202 on the ring circuit board 201 are configured, by using the short-circuit electrodes 203, as varistors connected to the processing unit 1.

As shown in FIG. 4, the size of the sector, occupied by the carbon film resistors 202, on the ring circuit board 201 is selected obviously according to the rotation ranges of the focusing ring 92, the zoom ring 93, and the aperture ring 93. Further, the processing unit 1, the accelerometer 24, the gyro sensor 25, the temperature and humidity sensor 26, the barometer 27, the magnetometer 28 can be disposed on the ring circuit board 201 of any one of the focusing ring position sensor 21, the zoom ring position sensor 22, and the aperture ring position sensor 23, or can be respectively disposed on the ring circuit boards of the focusing ring position sensor 21, the zoom ring position sensor 22, and the aperture ring position sensor 23.

Preferably, as shown in FIG. 5, the communication interface 3 and the power connector 4 share a physical port 7. The physical port 7 may be fixed on the surface of the photographic lens without affecting the operation of the photographic lens.

For those skilled in the art, the scope of protection of the present invention is not limited to the details in the foregoing exemplary embodiments, and without departing from the spirit or basic features of the present invention, the equivalent meanings and all modified implementations within the protection scope made by those skilled in the art based on the essentials of the present invention should be included in the present invention.

What is claimed is:

1. A method for acquiring operating parameters of a photographic lens implemented on a system for acquiring an operating parameter of the photographic lens, the system comprises: a control circuit and a storage unit that are configured in the photographic lens, wherein the control circuit comprises a processing unit and a focusing ring position sensor, a zoom ring position sensor, an aperture ring position sensor, an accelerometer, a gyro sensor, a communication interface, a power connector that are connected to the processing unit; the control circuit acquires the operating parameter of the photographic lens by using the focusing ring position sensor, the zoom ring position sensor, the aperture ring position sensor, the accelerometer and the gyro sensor, performs data encapsulation on the operating parameter, and writes an encapsulated parameter into the storage unit; and the control circuit is further connected to a camera or an external data reading device by using the communication interface, to output the operating parameter after the data encapsulation in real time;

the method comprising: acquiring in the photographic lens, by the control circuit, the operating parameters of the photographic lens; waiting for completion of data acquisition which involves data of the focusing ring position sensor, data of the zoom ring position sensor, data of the aperture ring position sensor, data of the accelerometer and data of the gyro sensor; performing data encapsulation, by the control circuit, on the operating parameters of the photographic lens, writing the encapsulated parameter into a storage unit; waiting for a next transmission according to a transmission rate after the data encapsulation; transmitting the encapsulated parameter to the camera or an external data reading device in real time through the communication interface; and returning to perform the step of waiting for completion of data acquisition after transmission of the encapsulated parameter is finished; wherein the acquiring, by a control circuit, an operating parameter of a photographic lens at least comprises:

(1) obtaining, by the control circuit, electrical signals corresponding to current positions of a focusing ring, a zoom ring, and an aperture ring respectively during rotations, to convert the electrical signals into optical parameters of a focus, a zoom, and an aperture; and (2) obtaining, by the control circuit, an electrical signal corresponding to a current pose of the photographic lens when the pose of the photographic lens changes, to convert the electrical signal into motion parameters comprising but not limited to a position parameter and a posture parameter.

2. The method for acquiring operating parameters of a photographic lens according to claim 1, wherein the acquiring, by the control circuit, the operating parameters of the photographic lens further comprises: obtaining, by the control circuit, electrical signals corresponding to an internal temperature and humidity of the photographic lens, to convert the electrical signals into current internal environment parameters of the photographic lens.

3. The method for acquiring operating parameters of a photographic lens according to claim 1, wherein the acquiring, by the control circuit, the operating parameters of the photographic lens further comprises: obtaining, by the control circuit, an electrical signal corresponding to an external environment air pressure of the photographic lens, to convert the electrical signal into current external environment parameter of the photographic lens.

4. A system for acquiring operating parameters of a photographic lens, comprising: a control circuit and a storage unit that are configured in the photographic lens, wherein the control circuit comprises a processing unit and a focusing ring position sensor, a zoom ring position sensor, an aperture ring position sensor, an accelerometer, a gyro sensor, a communication interface, a power connector that are connected to the processing unit; the control circuit is configured to acquire the operating parameters of the photographic lens by using the focusing ring position sensor, the zoom ring position sensor, the aperture ring position sensor, the accelerometer and the gyro sensor, wait for completion of data acquisition which involves data of the focusing ring position sensor, data of the zoom ring position sensor, data of the aperture ring position sensor, data of the accelerometer and data of the gyro sensor, perform data encapsulation on the operating parameters, and write an encapsulated parameter into the storage unit; and wherein the control circuit is further connected to a camera or an external data reading device through the communication interface, and the control circuit is configured to: wait for a next transmission according to a transmission rate after the data encapsulation, transmit the operating parameters to the camera or the external data reading device through the communication interface, and continue to wait for completion of the data acquisition after transmission of the operating parameters is finished.

5. The system for acquiring operating parameters of the photographic lens according to claim 4, wherein the control circuit further comprises a temperature and humidity sensor connected to the processing unit.

6. The system for acquiring operating parameters of the photographic lens according to claim 4, wherein the control circuit further comprises a barometer connected to the processing unit.

7. The system for acquiring operating parameters of the photographic lens according to claim 4, wherein the accelerometer and the gyro sensor are provided by a single integrated circuit, and the single integrated circuit additionally provides a magnetometer for the control circuit.

8. The system for acquiring operating parameters of the photographic lens according to claim 4, wherein the control circuit is provided with a multi-stage filter regulator unit, and the power connector is connected to a processing system by using the multi-stage filter regulator unit.

9. The system for acquiring operating parameters of the photographic lens according to claim 4, wherein the focusing ring position sensor, the zoom ring position sensor, and the aperture ring position sensor each comprise a ring circuit board attached to a lens body in the photographic lens, and the ring circuit boards are connected to the processing unit; two carbon film resistors are provided on the ring circuit board, the carbon film resistors are set in a fan ring concentrically aligned with the ring circuit board, and the two carbon film resistors are provided in parallel and spaced apart in the same fan sector of the ring circuit board; the focusing ring position sensor, the zoom ring position sensor, and the aperture ring position sensor comprise short-circuit electrodes correspondingly attached to a focusing ring, a zoom ring, and an aperture ring in the photographic lens, and the short-circuit electrode is provided with two elastic members; the two elastic members of the short-circuit electrodes in the focusing ring position sensor, the zoom ring position sensor, and the aperture ring position sensor are in elastic contact with the carbon film resistors on the ring circuit boards in a one-to-one correspondence, and the two elastic members slide along circumferences of the carbon film resistors, and when the focusing ring, the zoom ring, and the aperture ring of the photographic lens rotate, the two carbon film resistors on the ring circuit board are configured, by using the short-circuit electrodes, as varistors connected to the processing unit.

10. The system for acquiring operating parameters of the photographic lens according to claim 4, wherein the communication interface and a power interface share one physical port.

* * * * *